United States Patent
Yi et al.

(10) Patent No.: US 11,171,850 B2
(45) Date of Patent: Nov. 9, 2021

(54) EDGE COMPUTING DEVICE AND METHOD FOR CONTROLLING THEREOF

(71) Applicant: SAMSUNG SDS CO., LTD., Seoul (KR)

(72) Inventors: Kyu Yull Yi, Seoul (KR); Jin Seon Lee, Seoul (KR); Hyo Keun Choi, Seoul (KR); Suk Jeong Lee, Seoul (KR); Su Hyun Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/665,962

(22) Filed: Oct. 28, 2019

(65) Prior Publication Data

US 2021/0126846 A1 Apr. 29, 2021

(30) Foreign Application Priority Data

Oct. 25, 2019 (KR) .......... 10-2019-0133964

(51) Int. Cl.
*H04L 12/26* (2006.01)
*H04L 12/727* (2013.01)
*H04L 12/757* (2013.01)

(52) U.S. Cl.
CPC ........ *H04L 43/065* (2013.01); *H04L 43/0894* (2013.01); *H04L 45/023* (2013.01); *H04L 45/121* (2013.01)

(58) Field of Classification Search
CPC .................................................. H04L 43/065
See application file for complete search history.

(56) References Cited

U.S. PATENT DOCUMENTS

| | | | |
|---|---|---|---|
| 2011/0078303 A1* | 3/2011 | Li ..................... | H04L 67/1012 709/224 |
| 2011/0087783 A1* | 4/2011 | Annapureddy ....... | G06F 9/5061 709/226 |
| 2015/0026348 A1* | 1/2015 | Siddiqui ................ | H04L 67/10 709/226 |
| 2017/0237656 A1* | 8/2017 | Gage ................... | H04L 61/2521 370/392 |

FOREIGN PATENT DOCUMENTS

KR 10-2015-0137530 A 12/2015

* cited by examiner

*Primary Examiner* — Nicholas P Celani
(74) *Attorney, Agent, or Firm* — The PL Law Group, PLLC

(57) ABSTRACT

An edge computing device controlling method includes executing some function modules of a plurality of function modules for processing a service request from a user device on a first edge computing device of a plurality of edge computing devices and additionally executing the some function modules on a second edge computing device of the plurality of edge computing devices when additional resource is required for the some function modules.

4 Claims, 12 Drawing Sheets

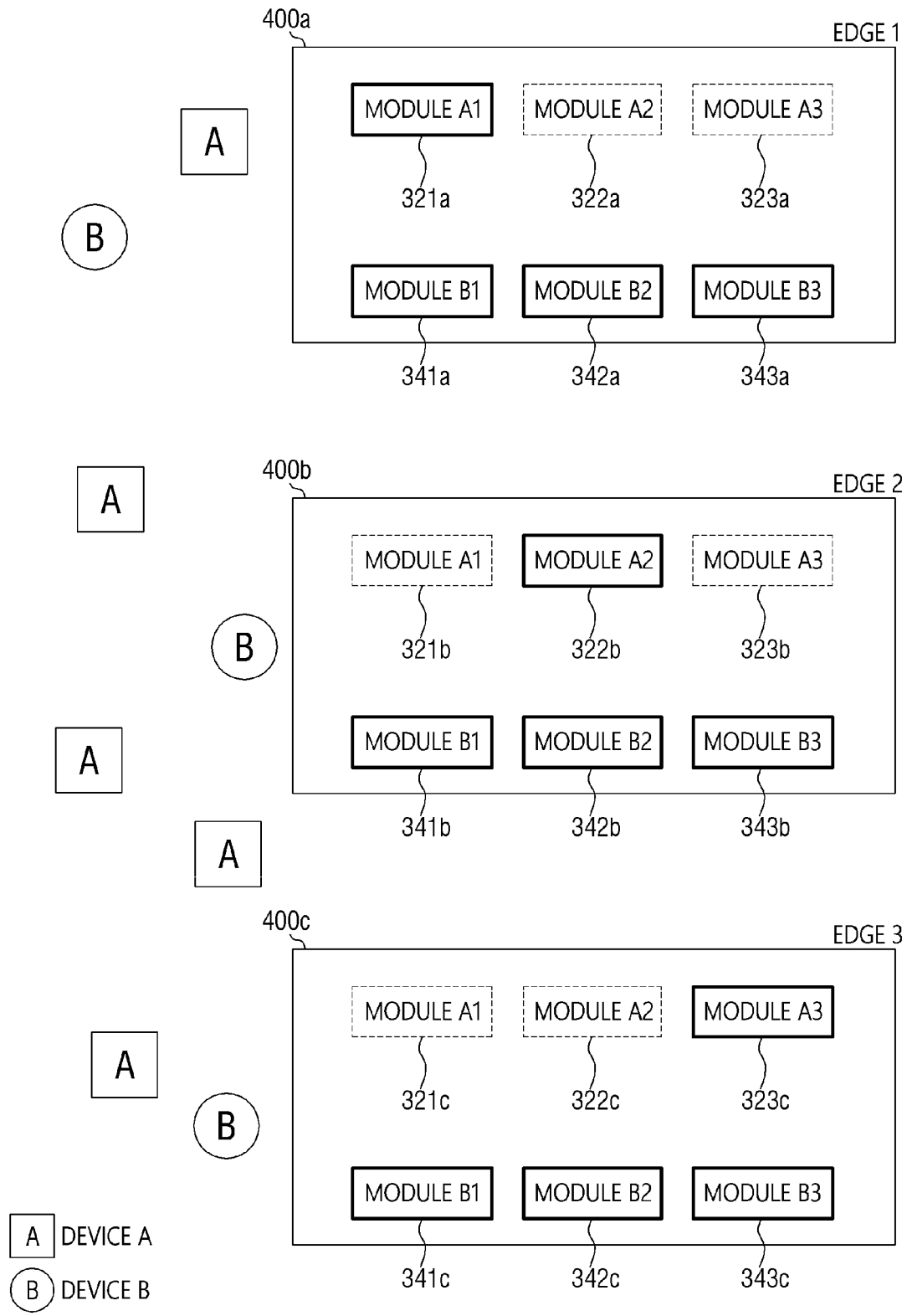

EDGE COMPUTING DEVICE AND METHOD FOR CONTROLLING THEREOF

CROSS REFERENCE TO RELATED APPLICATIONS AND CLAIM OF PRIORITY

This application claims the benefit of Korean Patent Application No. 10-2019-0133964 filed on Oct. 25, 2019 in the Korean Intellectual Property Office, the disclosure of which is incorporated herein by reference in its entirety.

FIELD

The present disclosure relates to an edge computing device and a controlling method thereof. More specifically, the present disclosure relates to an edge computing device, which efficiently use resources of edges installed in an edge computing environment, and a controlling method thereof.

DESCRIPTION OF THE RELATED ART

As the IT infrastructure that enterprises need to manage becomes more complex and network traffic grows, enterprises have invested a lot of money for adopting professional and software solutions for monitoring and analyzing network traffic and expanding IT infrastructure for additional computing power and storage space. To address the increased management complexity and cost associated with operating these traditional on-premise data centers or servers, more and more companies are turning their on-premises environments into cloud environments.

However, with the exponential growth of companies, general users, and devices that use cloud services, the amount of data that needs to be processed in the cloud server has increased greatly, and the burden of network fees and network delays occurred through transmission and reception of data due to transferring all data to the cloud and security issues arising from forwarding all data to a remote cloud server have newly emerged. Further, services that require real-time data processing, such as services for IoT devices, including connected cars, virtual reality (VR) and augmented reality (AR) services, cannot be commercialized if ultra-low latency communication cannot be guaranteed. However, it is difficult to guarantee ultra-low latency communication in a cloud computing environment where a remote cloud server processes all data.

Recently, edge computing or fog computing environments, which make up for the shortcomings of the on-premises and cloud computing environments described above, have been in the spotlight. An edge computing environment means that computing is performed in an edge device. Cloud computing processes all data in a remote data center, while in an edge computing environment, data is partially processed in an on-premises edge located nearby a client device, such as a user device and a sensor device.

FIG. 1 is a diagram schematically illustrating an edge computing environment. In an edge computing environment, at least some of data collected by user devices 20a to 20e or application requests from the user devices 20a to 20e are processed by edges 100 located nearby the user device 20a to 20e. In an edge computing environment, the data processing load of a cloud server 10 may be distributed among several edges. Further, the problem caused by the network delay between the user devices 20a to 20e and the cloud server 10 can be eliminated, and ultra-low delay communication and a real-time service by the edges 100 located nearby the user devices 20a to 20e can be realized.

Furthermore, even when a failure of the cloud server 10 occurs, it is possible to provide seamless services to the user devices 20a to 20e by edges that provide their own computing.

However, unlike cloud computing, which can be flexibly scaled within a data center according to data processing requirements or computing resource needs, edges installed on-premise in the field close to client devices have limited computing resources, and there is a limit that it is necessary to visit the site for expansion or reduction of hardware of edge devices.

Currently, the number of client devices to be connected, the number of Internet of Things devices or a data transmission period is predicted in advance, and thereby most edge devices are arranged in the field after allocating as many applications as they can process to limited resources. Recently, in order to increase the flexibility of using the computing resources of the edge device, methods for remotely accessing the edge device and distributing the application based on the available resources remaining in each edge device have been developed and utilized. For example, if the number of certain types of user devices that need to be connected to an edge device increases or the transmission cycles of certain types of user devices shortens, and thus an amount of data to be processed increases, applications for the certain type of user devices are further distributed to other edge devices arranged in the field. However, there is a possibility that the connection or data requests of the user devices are concentrated on a specific edge device among a plurality of edge devices arranged in the field, which is difficult to predict in advance. When the data requests from the user devices are concentrated on a specific edge device, there is no choice but to disperse a data request from the user device by visiting the site directly to replace the edge device with a high-end device or adding an additional edge device nearby the edge device.

SUMMARY

Some embodiments of the present disclosure provide an edge computing device, which efficiently use resources of edges installed in an edge computing environment, and a controlling method thereof.

Another embodiment of the present disclosure provides an edge computing device that can flexibly respond to the increase and decrease of various types of client devices in an edge computing environment and a controlling method thereof.

Embodiments of the present disclosure are not limited to the embodiments mentioned above, and other embodiments not mentioned above may be clearly understood by those skilled in the art from the following description.

According to the present disclosure, an edge computing device controlling method is provided. The method comprises executing, on a first edge computing device of a plurality of edge computing devices, some function modules of a plurality of function modules for processing a service request from a user device, and additionally executing the some function modules on a second edge computing device of the plurality of edge computing devices when additional resource is required for the some function modules.

According to an embodiment, additionally executing the some function modules comprises additionally executing the some function modules on the second edge computing device when processing time spent by the some function modules on the first edge computing device exceeds the maximum time allowed for the some function modules.

According to an embodiment, the second edge computing device is selected among the plurality of edge computing devices based on network latency from the first edge computing device.

According to an embodiment, the second edge computing device is selected by the first edge computing device.

According to an embodiment, additionally executing the some function modules on the second edge computing device comprises, updating, by the first edge computing device, a routing table that indicates function modules executed on each of the plurality of edge computing devices, and determining, by the first edge computing device in response to receiving a service request from the user device, one of the plurality of the edge computing devices, to which the service request is forwarded for subsequent processing of the service request based on the routing table.

According to the present disclosure, an edge computing device controlling method is provided. The method comprises executing, on a first edge computing device of a plurality of edge computing devices, a first function module for processing a first step of a plurality of steps of processing a service request from a user device, executing, on a second edge computing device of the plurality of edge computing devices, a second function module for processing a second step of the plurality of steps subsequent to the first step, and additionally executing the second function module on at least one of the plurality of edge computing devices when it is necessary to shorten processing time of the service request.

According to an embodiment, additionally executing the second function module comprises, additionally executing the second function module if the total time spent for processing the service request by the plurality of edge computing devices exceeds the maximum time allowed for completion of processing of the service request.

According to an embodiment, additionally executing the second function module comprises, executing the second function module on the first edge computing device if the second function module can be executed using an available resource of the first edge computing device.

According to an embodiment, the method further comprises additionally executing a third function module for processing a third step of the plurality of steps subsequent to a second step on the first edge computing device.

According to an embodiment, additionally executing the second function module comprises, executing the second function module on a third edge computing device if the second function module cannot be executed using an available resource of the first edge computing device, wherein the third edge computing device is selected among the plurality of edge computing devices that is not executing the second function module, a network latency between the first edge computing device and the third edge computing device less than a network latency between the first edge computing device and the second edge computing device.

According to an embodiment, the third edge computing device is selected by the first edge computing device.

According to an embodiment, the method further comprises additionally executing a third function module for processing a third step of the plurality of steps subsequent to a second step on the third edge computing device.

According to an embodiment, additionally executing the second function module on the third edge computing device comprises, updating, by the first edge computing device, a routing table that indicates function modules executed on each of the plurality of edge computing devices, and the method further comprising, determining, by the first edge computing device in response to receiving a service request from the user device, one of the plurality of edge computing devices, to which the service request is forwarded for subsequent processing of the service request based on the routing table.

According to the present disclosure, a system is provided. The system comprises a user device, and a plurality of edge computing devices, wherein a first edge computing device of the plurality of edge computing devices executes a first function module for processing a first step of a plurality of steps of processing a service request from the user device, wherein a second edge computing device of the plurality of edge computing devices executes a second function module for processing a second step of the plurality of steps subsequent to the first step, wherein a third edge computing device of the plurality of edge computing devices additionally executes the second function module when it is necessary to shorten processing time of the service request, wherein a network latency between the third edge computing device and the first edge computing device is less than a network latency between the second edge computing device and the first edge computing device, wherein one of the plurality of edge computing devices additionally executes the first function module when additional resource is required for the first function module.

BRIEF DESCRIPTION OF THE DRAWINGS

These and/or other aspects will become apparent and more readily appreciated from the following description of the embodiments, taken in conjunction with the accompanying drawings in which:

FIGS. 11a and 11b are diagrams for exemplarily describing function modules executed on a plurality of edge computing devices as a result of performing the method described with reference to FIGS. 9 and 10.

DETAILED DESCRIPTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted. The use of the terms "a" and "an" and "the" and similar referents in the context of describing the invention (especially in the context of the following claims) are to be construed to cover both the singular and the plural, unless otherwise indicated herein or clearly contradicted by context.

The terms "first," "second," "A," "B," (a)," and "(b)" are used in this specification merely to differentiate an element from another element, not to specify a nature or an order with regard to the element.

Hereinafter, some embodiments of the present disclosure will be described in detail with reference to the accompanying drawings.

Figure 1:
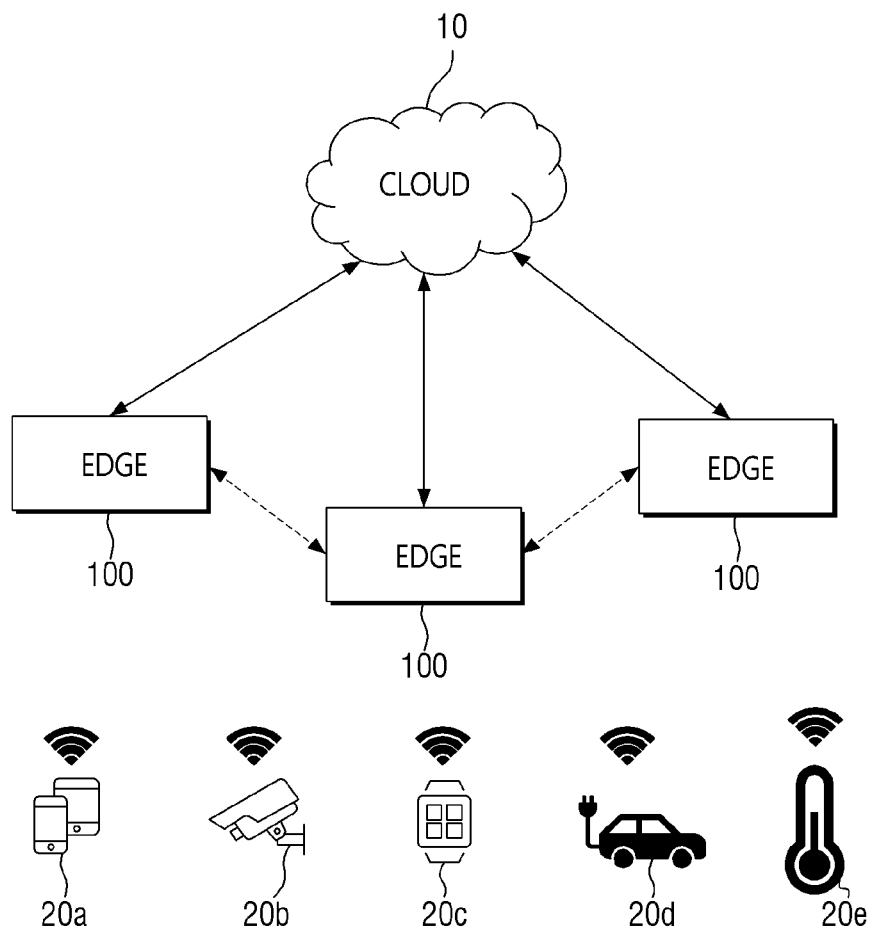
FIG. 1 is a diagram for describing an environment, in which an edge computing device operates according to an embodiment of the present disclosure.

FIG. 1 is a diagram for describing an environment, in which an edge computing device 100 operates, according to an embodiment of the present disclosure.

The edge computing device 100 shown in FIG. 1 may be connected to the cloud 10 and user devices 20a to 20e through a network. Compared to a server 10 located in the cloud, the edge computing device 100 may be arranged at a location physically close to the user devices 20a to 20e. The edge computing device 100 may be arranged to reduce network delay between the user devices 20a to 20e and the cloud server 10.

In some embodiments, the edge computing devices 100 may be connected to the cloud 10 through a wide area network (WAN), a mobile network, or the like, and the edge computing devices 100 may be connected to the user devices 20a to 20e and/or other edge computing devices 100 through a local area network (LAN) and a wireless network.

In some embodiments, the edge computing device 100 may process data collected from the user devices 20a to 20e and provide the result to the cloud server 10. Further, the edge computing device 100 may process an application service request of the user devices 20a to 20e and provide the result to the user devices 20a to 20e. The edge computing device 100 may provide the intermediate and final results of the data processing as described above to the other edge computing device 100 or forward the application service request.

As shown in FIG. 1, in some embodiments, the edge computing device 100 may process different application requests of different types of user devices 20a to 20e. In other words, the edge computing device 100 may provide an application service to different types of user devices 20a to 20e.

Figure 2:
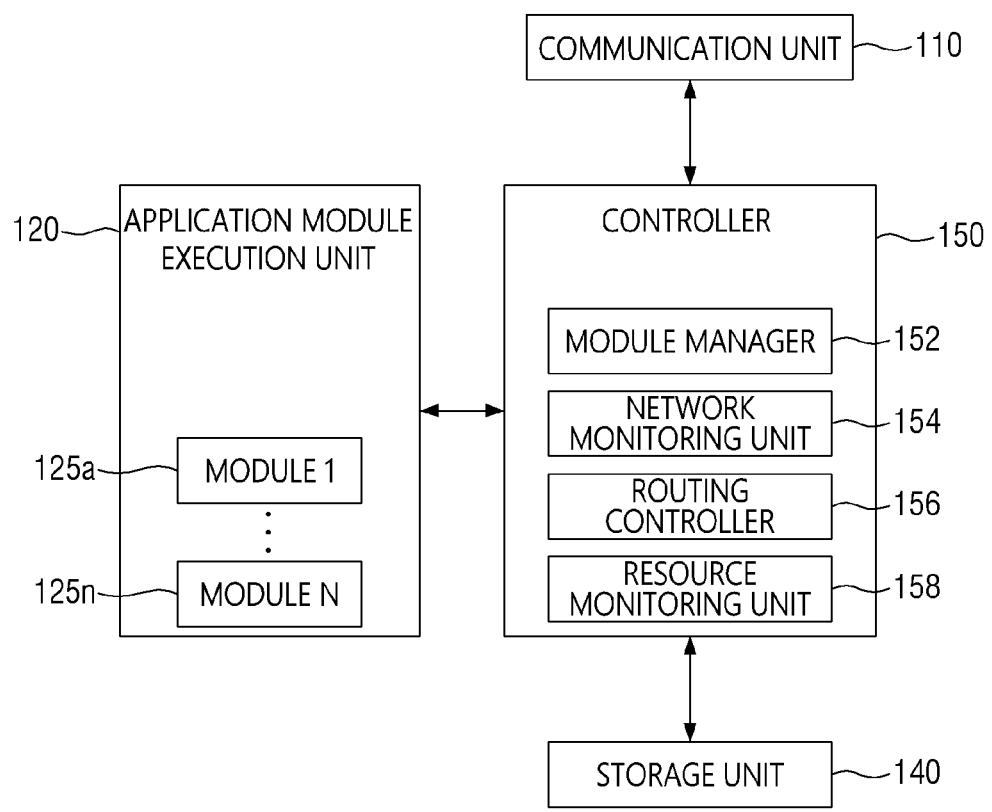
FIG. 2 is a block diagram of an edge computing device according to an embodiment of the present disclosure.

FIG. 2 is a block diagram of an edge computing device 100 in accordance with an embodiment of the present disclosure. The edge computing device 100 includes a network device, such as a router, a switch, an integrated access device (IAD). Further, the edge computing device 100 includes various industrial devices, such as a computing device for collecting and analyzing the condition of a factory facility and a device for managing and integrating sensors for monitoring weather conditions. Further, the edge computing device 100 includes home devices, such as a hub device for providing an IoT service and an AI speaker.

The edge computing device 100 may include a communication unit 110, an application module execution unit 120, a storage unit 140 and a controller 150.

The communication unit 110 may send and receive various signals and data, such as an audio, an image and a sensor measurement value from an external device. The communication unit 110 may include a network communication device, such as a wireless communication chip and a wired/wireless network adapter.

The application module execution unit 120 executes one or more function modules for processing and analyzing data collected from the user devices 20a to 20e or for processing application requests of the user devices. The application module execution unit 120 may execute a plurality of function modules that perform different functions for different user devices 20a to 20e. Further, the application module execution unit 120 may execute two or more modules that perform one function simultaneously. For example, by creating two or more instances of the same function module, requests from two or more user devices 20a to 20e for the same function may be processed in parallel.

Figure 3A:
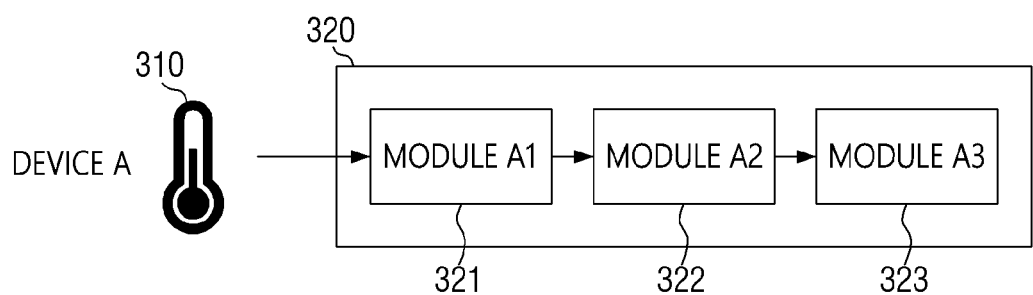
FIGS. 3a and 3b are diagrams for describing exemplary function modules that configure an application service provided to user devices by an edge computing device according to some embodiments of the present disclosure.
Figure 3B:
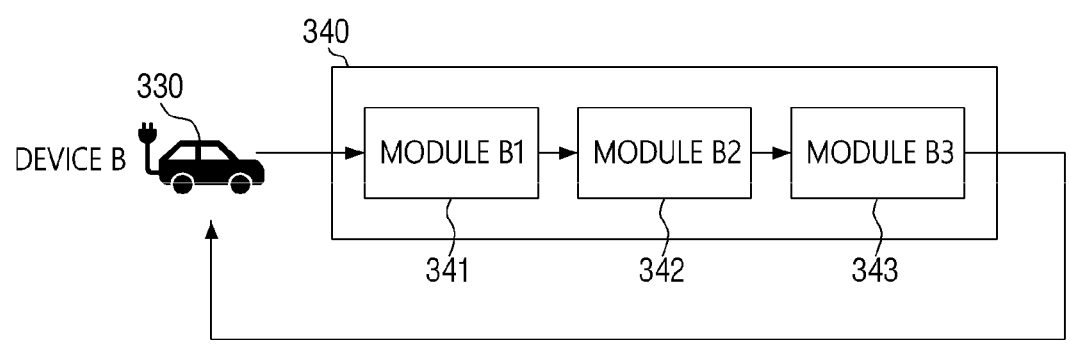

Referring to FIGS. 3a and 3b, modules for processing application service requests of user devices, which may be executed by the application module execution unit 120, will be described. FIGS. 3a and 3b exemplarily illustrate function modules for processing each step of an application service request from a device model A 310 and a device model B 330, respectively.

The device A 310 of FIG. 3a may be, for example, a temperature and humidity sensor. Data collected from the device A 310 may be received by the edge computing device 100 and analyzed and processed by an application 320. The application 320 may process the application request of the device A 310 by, for example, three steps, such as data preprocessing, data analysis and event processing. An application for the device A 310 may be configured by a function module A1 321, a function module A2 322 and a function module A3 323, respectively, processing three steps for processing an application request of the device A 310. An application request from the device A 310 may be processed sequentially by the function modules A1 321 to A3 323.

The device B 330 of FIG. 3b may be, for example, a smart car. Data collected from the device B 330 may be received by the edge computing device 100 and analyzed and processed by an application 340. The application 340 may process an application request of the device B 330 by, for example, three steps of noise removal, data processing and data analysis. An application for device B 330 may be configured by a function module B1 341, a function module B2 342 and a function module B3 343, respectively, processing three steps for processing an application request of the device B 330. An application request from the device B 330 may be sequentially processed by the function modules B1 341 to B3 343. After the final step of the application request is processed by the function module B3 343, the result may be provided to the device B 330.

In the above description of FIGS. 3a and 3b and the following description, it is described that the application requests of the device A 310 and the device B 330 are divided into three steps and are processed by three function modules, respectively, however, this is merely an example for convenience of description. Requests of various user devices may be divided into different steps and processed by different numbers of function modules.

Referring to FIG. 2 again, the storage unit 140 of the edge computing device 100 will be described.

The storage unit 140 stores various data commands and/or information. The storage unit 140 may store one or more programs for providing an edge computing controlling method according to embodiments of the present disclosure. Further, the storage unit 140 may store executable files, binaries, source codes, and the like of function modules (e.g., modules A1 to A3 of FIG. 3a and modules B1 to B3 of FIG. 3b) that may be executed by the application module execution unit 120. Further, the storage unit 140 may store data provided by the user devices 20a to 20e and processed results thereof. The storage unit 140 may temporarily or non-temporarily store data transmitted from an external device or input by a user or an operation result of the controller 150. The storage unit 140 may include a nonvolatile memory, such as a read only memory (ROM), an erasable programmable ROM (EPROM), an electrically erasable programmable ROM (EEPROM), a flash memory, a hard disk, a removable disk, an SD memory card or any type of computer-readable recording medium well known in the art, to which the present disclosure belonging.

The controller 150 controls the overall operation of each component of the edge computing device 100. The controller 150 may be configured to include a central processing unit (CPU), a micro-processor unit (MPU), a micro controller unit (MCU), a mobile processor, or any type of processor well known in the art of the present disclosure. Further, the controller 150 may perform operations on at least one application or program for executing a method according to embodiments of the present disclosure.

More specifically, the controller 150 may include a module manager 152, a network monitoring unit 154, a routing controller 156 and a resource monitoring unit 158.

The module manager 152 may control the application module execution unit 120 to execute at least some of the function modules (e.g., modules A1 to A3 of FIG. 3a and modules B1 to B3 of FIG. 3b) stored in the storage unit 140. The module manager 152 may transmit a message through the communication unit 110 to request other edge computing device 100 to additionally execute the function module. The module manager 152 may determine whether to execute additional function modules with the available resources of the edge computing device 100. When the edge computing device 100 receives a request for additional execution of a function module or resource confirmation request from the cloud server 10 or other edge computing device 100, the module manager 152 may reply about whether to able to perform the request and the performing result through the communication unit 110.

The module manager 152 may manage and record a list of function modules (e.g., modules A1 to A3 of FIG. 3a and modules B1 to B3 of FIG. 3b) required to perform an application request of the user device. Further, the module manager 152 may manage and record information regarding the maximum value of time allowed for processing of each function module processing each step of the application request. Further, the module manager 152 may manage and record the maximum value of the total time allowed for completing the processing of all steps of the application request. Table 1 below shows an example of recording the maximum value of time allowed for processing each step of an application request of the user device A and the user device B, and the maximum value of time allowed for processing all the steps.

TABLE 1

|  | Step 1 | Step 2 | Step 3 | Total Time |
|---|---|---|---|---|
| Device Model A | 8 ms | 15 ms | 9 ms | 80 ms |
| Device Model B | 14 ms | 25 ms | 6 ms | 60 ms |

The network monitoring unit 154 may monitor and record network latency between the edge computing devices 100. As exemplarily shown in Table 2 below, the network monitoring unit 154 may record a latency table, in which the network latency between itself and all other edge computing devices is calculated, in the storage unit 140. Furthermore, in some embodiments, the network monitoring unit 154 may receive data about network latency between all other edge computing devices from the other edge computing devices and record the data in the storage unit 140.

TABLE 2

|  | Edge 1 | Edge 2 | Edge 3 |
|---|---|---|---|
| Edge 1 | 0 ms | 10 ms | 32 ms |
| Edge 2 | 10 ms | 0 ms | 8 ms |
| Edge 3 | 32 ms | 8 ms | 0 ms |

Network latency can be calculated by various methods suitable for the environment and application, to which embodiments of the present disclosure apply. For each of the other edge computing devices, any one of the averages of the network latency, the average of the network latency over the last specific time and the network latency in the final data transmission and reception can be selected and recorded and utilized as the network latency to the corresponding edge computing device.

The routing controller 156 controls the forwarding of the application request and its intermediate processing result in order to complete the application service request of the user devices 20a to 20e. More specifically, the routing controller 156 determines other edge computing device 100, to which the application request is forwarded, to process all or some of the application request received by the edge computing device 100 from the user device or the other edge computing device 100 and forwards the application request and the intermediate processing result through the communication unit 110. To this end, the routing controller 156 may record a routing table including the current status of the function modules, which each of the plurality of edge computing devices 100 is executing, in the storage unit 140. Table 3 below is an exemplary routing table recording the current status of the modules, which each of the three edge computing devices (edges 1 to 3) is executing.

TABLE 3

|  | Module A1 | Module A2 | Module A3 |
|---|---|---|---|
| Edge 1 | YES | NO | YES |
| Edge 2 | YES | YES | NO |
| Edge 3 | YES | NO | YES |

In some embodiments, the routing controller 156 may determine a subsequent edge computing device 100, to which the application request is forwarded, to process subsequent steps of the application request received by the edge computing device 100. In this case, the subsequent edge computing device 100 may be determined, for example, based on the latency table shown in Table 2 above and the routing table shown in Table 3 above. It is assumed that after completion of processing the second step of the application request by edge 2, the subsequent step should be processed by module A3. The routing controller 156 of the edge 2 may identify the edge 1 and the edge 3 executing the module A3 with reference to the routing table as shown in Table 3 above. Subsequently, the routing controller 156 of edge 2 may determine edge 3 (see latency table of Table 2 above) having the shorter network latency from edge 2 among edge 1 and edge 3 as the subsequent edge computing device 100 and forward the application request.

The resource monitoring unit 158 monitors and records available resources of the edge computing device 100. The resource monitoring unit 158 may monitor the available memory, the available processing time, the available storage capacity, and the like of the edge computing device 100 in real-time. The resource monitoring unit 158 may provide information about the available resources of the edge computing device 100 to other components of the edge computing device 100, such as the module manager 152.

So far, the functional configuration of the edge computing device 100 according to an embodiment of the present disclosure has been described. In the following, edge computing device controlling methods according to some other embodiments of the present disclosure will be described.

Figure 4:
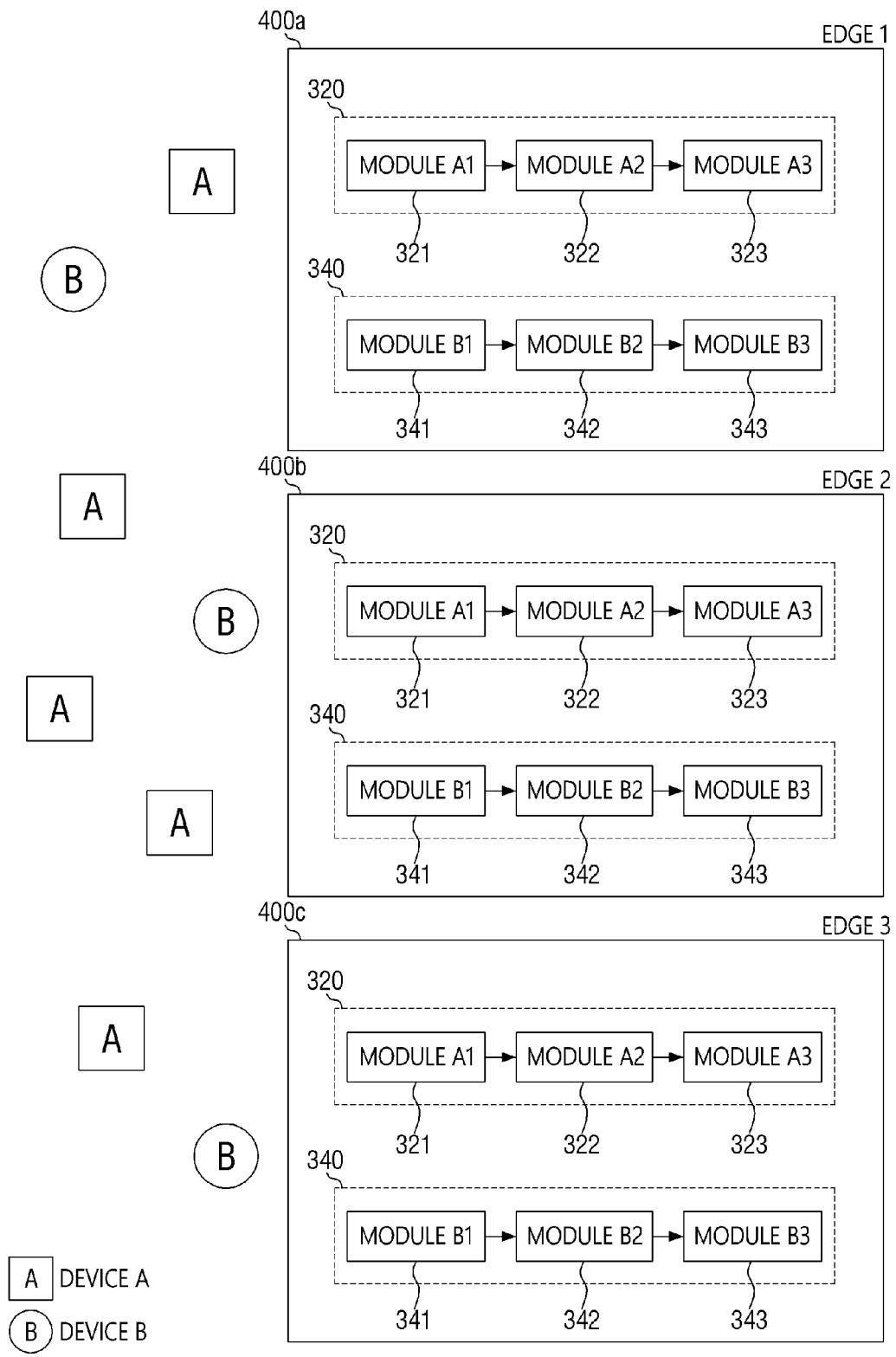
FIGS. 4 and 5 are diagrams for describing an exemplary state of function modules executed on a plurality of edge computing devices in an edge computing device controlling method according to some embodiments of the present disclosure.
Figure 5:
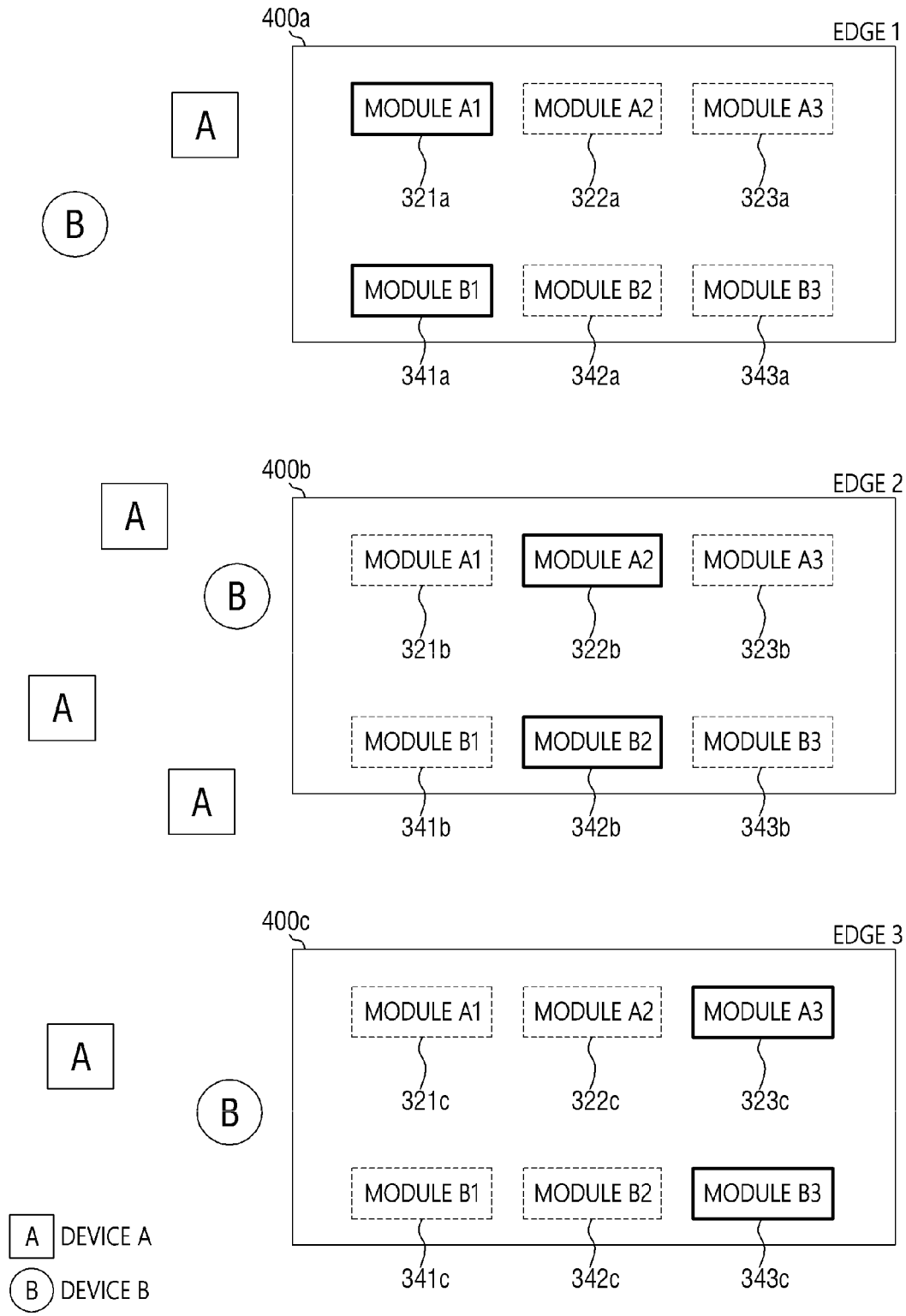

FIGS. 4 and 5 illustrate an exemplary state of function modules executed on a plurality of edge computing devices 400*a*, 400*b* and 400*c* in an edge computing device controlling method according to some embodiments of the present disclosure. The three edge computing devices 400*a*, 400*b* and 400*c* shown in FIGS. 4 and 5 may be edge computing devices arranged at physically spaced locations.

FIG. 4 illustrates that all modules configuring an application 320 for processing a request of device A (modules A1 to A3) and all modules configuring an application for processing a request of device B (modules B1 to B3) are distributed and executed on the edge computing devices (400*a*, 400*b* and 400*c*). When the modules are distributed and being executed as shown in FIG. 4, the request of the user device (devices A and B) is processed, for example, by any one of the edge computing devices 400*a*, 400*b* and 400*c* alone that is closest to the corresponding user device. However, if too many devices A are introduced into one edge computing device, for example, edge 2 400*b*, the service of device A can be concentrated on only edge 2 400*b* among the edge computing devices 400*a*, 400*b* and 400*c*. If such a situation persists, it may exceed the data throughput that can be processed by the limited resources provided at edge 2 400*b*, which may cause a service delay for device A. If a situation that a request of a specific device is concentrated on one edge 2 400*b* and the service is delayed persists, the corresponding edge 2 400*b* should be replaced with a device having higher performance or edge computing devices should be added near the edge 2 400*b*. This requires a service provider to invest time and money.

FIG. 5 illustrates an exemplary initial execution state of function modules in a plurality of edge computing devices 400*a*, 400*b* and 400*c* to describe an edge computing device controlling method, in which execution of function modules is dynamically adjusted, according to some embodiments of the present disclosure. According to the present embodiment, function modules for processing each step of an application request of a user device are distributed to a plurality of edge computing devices 400*a*, 400*b*, and 400*c* and selectively executed, and whether to execute each module in each device can be adjusted dynamically.

In the exemplary initial execution state shown in FIG. 5, modules shown with the border of a thick solid line are executing on a corresponding edge computing device, and modules shown with the border of a dotted line are modules not executing on the corresponding edge computing device. For example, in FIG. 5, at edge 1 400*a*, module A1 321*a* and module B1 341*a* are executing, while other modules (modules A2, A3, modules B2, B3) are not executing. Further, at edge 2 400*b*, module A2 322*b* and module B2 342*b* are executing, and other modules (modules A1, A3, modules B1, B3) are not executing. Unlike the state shown in FIG. 4, each of the edge computing devices 400*a*, 400*b* and 400*c* shown in FIG. 5 is executing only some of the modules for processing an application request of device A or device B, respectively.

In the exemplary initial execution state shown in FIG. 5, edge 1 400*a* executes only module A1 321*a* for device A and module B1 341*a* for device B. When edge 1 400*a* receives an application request from device A located near edge 1 400*a*, edge 1 400*a* processes the first step of the request by module A1 321*a* that is being executed by edge 1 400*a*. The routing controller 156 of edge 1 400*a* may then refer to the routing table to determine the edge computing device that is executing module A2 to process the second step of the request. The request is forwarded to edge 2 400*b* and the second step is processed by module A2 322*b*, and then forwarded to edge 3 400*c* and the final third step is processed by module A3 323*c*.

In the exemplary initial execution state shown in FIG. 5, edge 2 400*b* executes only module A2 322*b* for device A and module B2 342*b* for device B. If edge 2 400*b* receives an application request from device A located near edge 2 400*b*, edge 2 400*b* determines an edge computing device executing module A1 to process the first step of the request. The request that edge 2 400*b* receives from device A is forwarded to edge 1 400*a*, and the request is processed by module A1 321*a* of edge 1 400*a*, module A2 322*b* of edge 2 400*b* and module A3 323*c* of edge 3 400*c* sequentially.

Similarly, when edge 3 400*c* receives an application request from nearby device B, it is forwarded to edge 1 400*a* executing module B1 to process the first step of the request, and then forwarded to edge 2 400*b* and edge 3 400*c* sequentially to complete the processing of the request.

In this embodiment, at each step, in which a request from device A or device B is processed by respective edge computing devices 400*a* to 400*c*, a control message may be recorded and added to the request. The control message for each request includes the type of device who originally sent the request, the identifier of the edge computing device that received the corresponding request from the device, the module that processed each step of the corresponding request and the processing time and the total time spent to complete the request processing (this includes the network latency occurred during the process of forwarding the corresponding request between the edge computing devices). Tables 4 to 6 below are examples of control messages recorded during processing requests from device A, device A and device B, respectively.

TABLE 4

| Device Model | Start Edge | First Step | Second Step | Third Step | Total Time |
|---|---|---|---|---|---|
| Device A | Edge 2 | Edge 1 (7 ms) | Edge 2 (12 ms) | Edge 3 (7 ms) | 54 ms |

TABLE 5

| Device Model | Start Edge | First Step | Second Step | Third Step | Total Time |
|---|---|---|---|---|---|
| Device A | Edge 1 | Edge 1 (18 ms) | Edge 2 (15 ms) | Edge 3 (11 ms) | 62 ms |

TABLE 6

| Device Model | Start Edge | First Step | Second Step | Third Step | Total Time |
|---|---|---|---|---|---|
| Device B | Edge 3 | Edge 1 (13 ms) | Edge 2 (20 ms) | Edge 3 (6 ms) | 89 ms |

The control message of Table 4 above shows that a service request from device A was received by edge 2 400b, the request was forwarded to edge 1 400a, and it took 7 ms for the first step to be processed by module A1 321a of edge 1 400a, and it was forwarded to edge 2 400b and took 12 ms for the second step to be processed by module A2 322b, and it was forwarded to edge 3 400c and took 7 ms for the third step to be processed by module A3 323c, and the total of 54 ms was taken to process the request including the network time caused by forwarding the request from edge 2 400b to edge 1 400a, from edge 1 400a to edge 2 400b, and from edge 2 400b to edge 3 400c. In short, the request from the device A took 7 ms for processing the first step, 12 ms for processing the second step, and 7 ms for processing of the third step, and the total time for processing the request was 54 ms.

The processing time of each step of the request and the total time satisfy all of the maximum allowable time for processing requests from device A (see Table 1 described above). Therefore, in this case, selectively allocating the execution of modules A1 to A3 for processing each step of the request of the device A to the edge 1 400a to the edge 3 400c as shown in FIG. 5 caused no problem.

Meanwhile, the control message shown in Table 5 indicates that the service request from another device A was received by edge 1 400a, and it took 18 ms for the first step to be processed by module A1 321a of edge 1 400a, and it took 15 ms for the second step to be processed by module A2 322b of edge 2 400b, and it took 11 ms for the third step to be processed by module A3 323c of edge 3 400c, and the total of 62 ms was taken including the network time.

Comparing this with the maximum value of the time allowed for processing the request from the device A shown in Table 1 described above, it took 18 ms exceeding 8 ms, which is the maximum time allowed for processing the first step, and it took 11 ms exceeding 9 ms, which is the maximum time allowed for processing the third step. That is, the processing of the first and third steps is delayed in the processing of the request. This example may imply that a service request, which exceeds the amount of data that module A1 321a of edge 1 400a that processed the first stage and module A3 323c of edge 3 400c that processed the third stage can process, respectively, is introduced. That is, it may imply that additional resource for the processing of the modules A1 and A3 is required. A method of inputting additional resources for the modules to cope with such a situation will be described later with reference to FIGS. 6 to 8.

Meanwhile, the control message shown in Table 6 indicates that the service request from device B was received by edge 3 400c, and it took 13 ms for the first step to be processed by module B1 341a of edge 1 400a, and it took 20 ms for the second step to be processed by module B2 342b of edge 2 400b, and it took 6 ms for the third step to be processed by module A3 343c of edge 3 400c, and the total of 89 ms was taken including the network time.

Comparing this with the maximum value of the time allowed for processing the request from the device B shown in Table 1 described above, although the processing of each step was completed within the maximum time allowed for each of the first to third steps, it took 89 ms exceeding 60 ms, which is the maximum value of the total time allowed for processing the request from the device B. This is because too much network delay is occurred from sequentially forwarding the request received by edge 3 400c from the device B from edge 3 400c to edge 1 400a, edge 2 400b and edge 3 400c. Such an example may imply that when the request of device B is distributed to edge 1 400a to edge 3 400c and processed by them step by step, it is necessary to optimize the processing path of the request to reduce the network delay time. A method of optimizing the request processing path to cope with such a situation will be described later with reference to FIGS. 9 to 11b.

Hereinafter, an edge computing device controlling method according to another embodiment of the present disclosure will be described with reference to FIGS. 6 to 8. In particular, through this embodiment, a method of inputting additional resources for some function modules will be described.

The edge computing device controlling method according to the present embodiment may be performed in a computing device. For example, the computing device may be the edge computing device 100 described with reference to FIGS. 1 and 2 or the edge computing devices 400a to 400c described with reference to FIGS. 4 and 5. In interpreting the edge computing device controlling method according to the present embodiment, the embodiments described with reference to FIGS. 1, 2, 4, and 5 may be reflected. Hereinafter, when the subject of each operation included in the edge computing device controlling method according to the present embodiment is omitted, the subject may be interpreted as a computing device.

Figure 6:
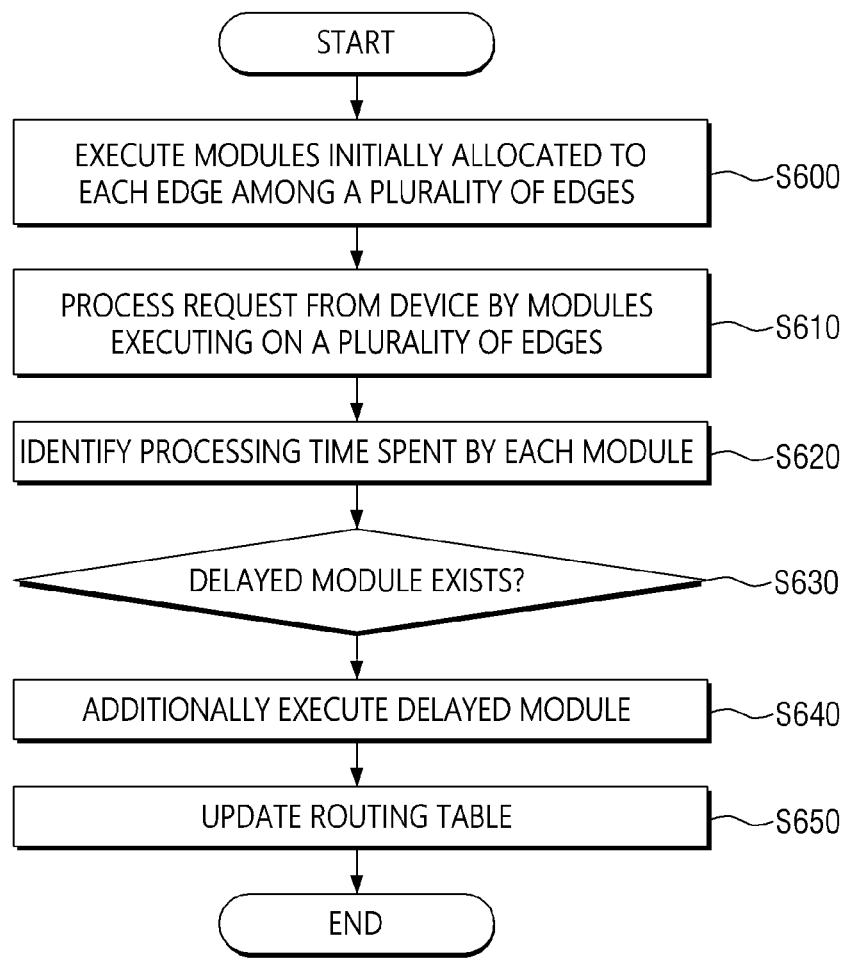
FIGS. 6 and 7 are flowcharts for describing an edge computing device controlling method according to another embodiment of the present disclosure.
Figure 7:
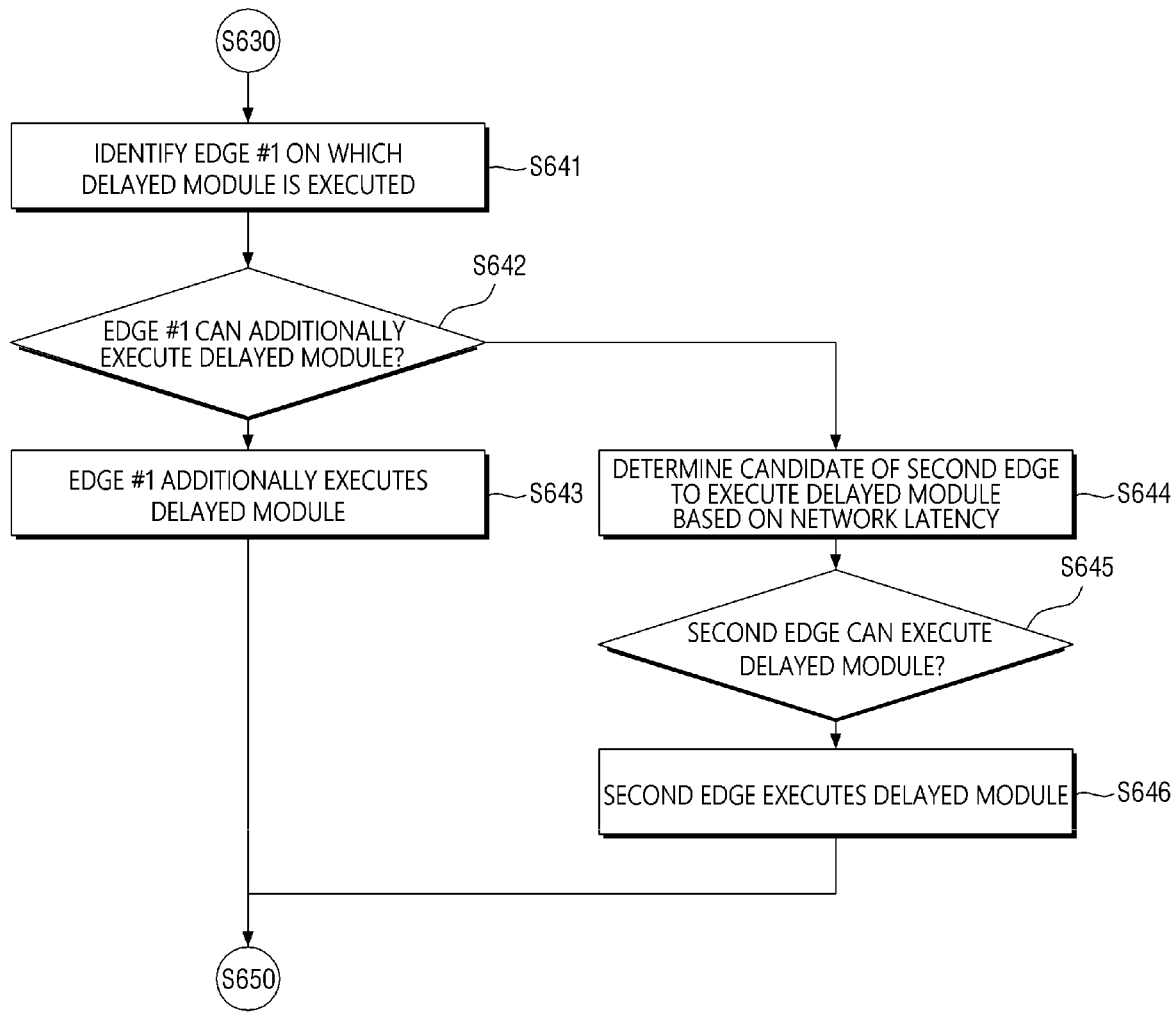

FIGS. 6 and 7 are flowcharts for describing an edge computing device controlling method according to the present embodiment. FIG. 8 is a diagram for exemplarily describing function modules executed on a plurality of edge devices as a result of performing the method described with reference to FIGS. 6 and 7.

In the following description of this embodiment, it is assumed that a computing environment is equipped with three edge computing devices 400a to 400c. Further, it is assumed that the initial state of the modules executed on the edge computing devices 400a, 400b and 400c is the same as FIG. 5. Further, it is assumed that the time allowed for processing the application request of the user device A is the same as Table 1 above, and the network latency between the three edge computing devices (edge 1 400a to edge 3 400c) is the same as Table 2 above.

First, it will be described with reference to FIG. 6. At step S600, respective modules initially allocated to each edge of the plurality of edges are executed. As a result of performing step S600, for example, as illustrated in FIG. 5, some of the function modules for user devices A and B may be executed on the plurality of edge computing devices 400a, 400b, and 400c, respectively.

At step S610, an application service request from any one user device is processed by modules executed on a plurality of edges. For example, an application service request from any user device A located near edge 1 400a is received by edge 1 400a and the first step is processed by module A1 321a of edge 1 400a, forwarded to edge 2 400b and the second step is processed by module A2 322b of edge 2 400b, and forwarded to edge 3 400c and the third step is processed by module A3 323c of edge 3 400c.

At step S620, the time spent by each of the modules A1 to A3 for processing the first to third steps of the request is identified through a control message recorded during processing the application request. Step S620 may be performed by edge 3 400c, which processed the final step of the request. For purposes of description, it is assumed here that the control message is the same as the one shown in Table 5 above.

At step S630, it is determined whether or not the maximum time allowed for each module for processing each step is exceeded, and it is determined whether there exists a delayed module. Comparing the control message shown in Table 5 with the maximum allowable time shown in Table 1, the processing time of the modules A1 and A3 (18 ms and 11 ms, respectively) processing the first and third steps exceeds the maximum allowable time (8 ms and 9 ms, respectively). Therefore, it can be determined that the processing of the modules A1 and A3 is delayed, and the modules A1 and A3 are identified as the delayed modules.

At step S640, delayed modules A1 and A3 are additionally executed. A method of additionally executing the delayed module will be described in detail with reference to FIG. 7.

At step S641, the first edge, on which the delayed module is executed, is identified. For example, with reference to the control message of Table 5, edge 1 400a, which processed the first step by module A1, and edge 3 400c, which processed the third step by module A3, are identified. The process of additionally executing module A1 will be described first, and the process of additionally executing module A3 will be described thereafter.

At step S642, it is determined whether the module A1 can be additionally executed on the edge 1 400a, on which the module A1 is executing. In some embodiments, the module manager 152 of the edge 1 400a may determine whether module A1 can be additionally executed on the edge 1 400a based on the status of available resource within the edge 1 400a which is provided by the resource monitoring unit 158 of the edge 1 400a.

If it is determined that the module A1 cannot be additionally executed using the available resources within the edge 1 400a, the module manager 152 of the edge 1 400a selects a candidate of the second edge capable of executing the module A1 at step S644. In some embodiments, the candidate of the second edge may be selected giving priority to an edge with low network latency from edge 1 400a. This is because the lower the network latency from the edge 1 400a is, the better edge it is for dividing up the execution of the module A1 for the application request flowing into the edge 1 400a. If the network latency between the second edge and the edge 1 400a is high, due to the network delay occurred while forwarding the service request flowing into the edge 1 400a to the second edge, the total time required for processing the service request may be increased, which may cause an obstacle in providing services, where real-time data processing based on ultra-low delay communication is essential.

If the network latency between edge 1 400a, edge 2 400b and edge 3 400c is as shown in Table 2 above, among edge 2 400b and edge 3 400c, edge 2 400b with lower network latency from edge 1 400a may be considered as a first candidate for a second edge.

At step S645, it is determined whether the candidate for the second edge selected at step S644 can execute the module A1. The candidate for the second edge may determine whether the module A1 is executable based on its available resource status and provide the result of such determination to edge 1 400a.

Although not shown, if it is determined at step S645 that none of the candidates for the second edge can additionally execute the module A1, the result of such determination is provided to the cloud server 10 so that the cloud server 10 process some of the requests of the device A.

When the module A1 is executable with the available resources of the candidate for a second edge, the second edge is decided, and the module A1 is executed on the second edge (step S646). For example, when the module A1 is executable with the available resources of the edge 2 400b, the module manager 152 of the edge 2 400b causes the application module execution unit 120 of the edge 2 400b to create an instance for module A1 and execute module A1.

Figure 8:
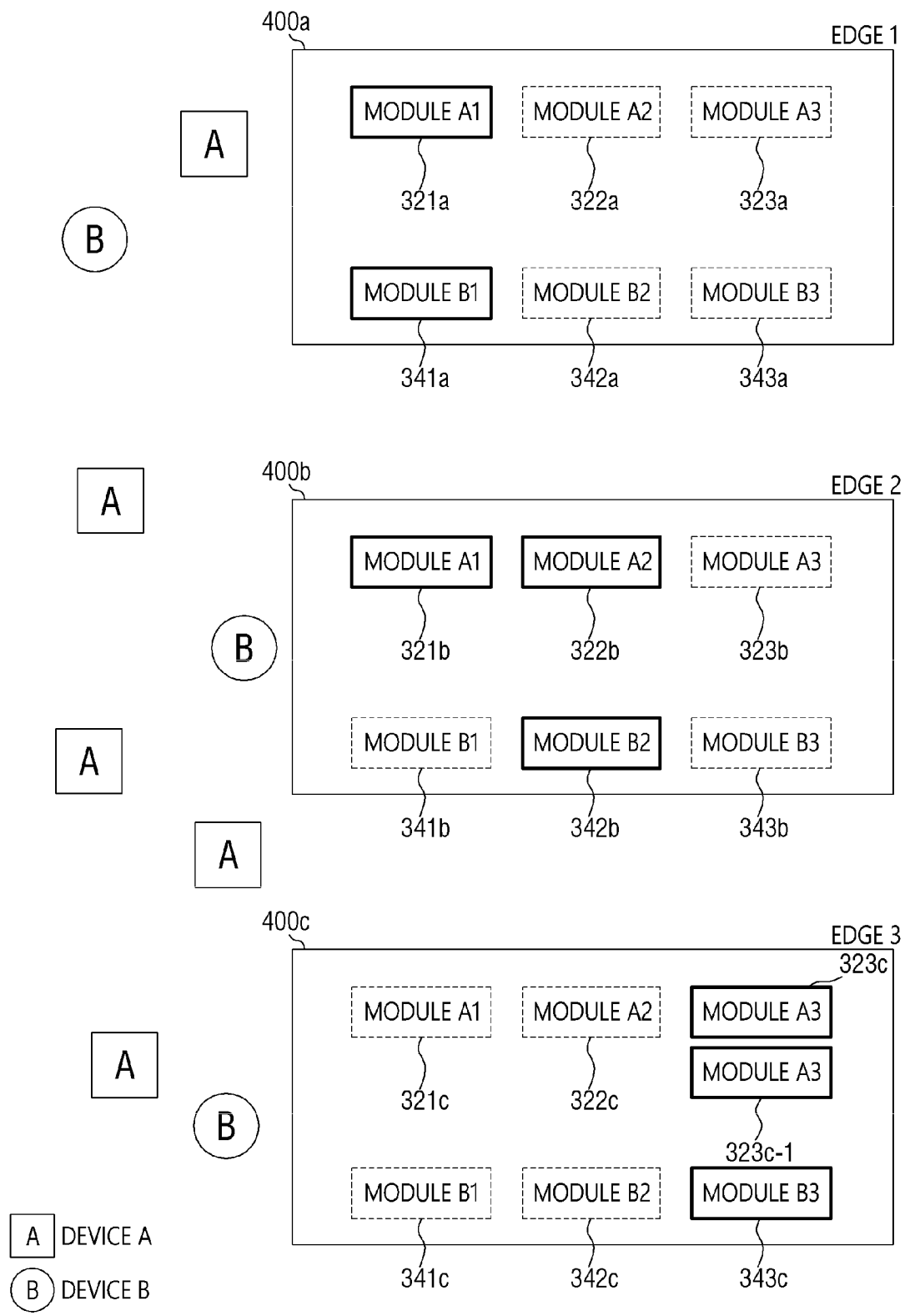
FIG. 8 is a diagram for exemplarily describing function modules executed on a plurality of edge computing devices as a result of performing the method described with reference to FIGS. 6 and 7.

The result of this execution can be more clearly understood with reference to edge 2 400b of FIGS. 5 and 8. Similar to FIG. 5, modules illustrated with solid thick border lines in FIG. 8 are executing on the corresponding edge computing device, and modules illustrated with dotted border lines are modules not executing on the corresponding edge computing device.

Although module A1 321b is not executing on edge 2 400b shown in FIG. 5, edge 2 400b shown in FIG. 8 is changed to a state, in which module A1 321b is executing. As a result, the first step of the application service request from device A may be processed by both edge 1 400a and edge 2 400b. That is, since the available resources of the edge 2 400b are efficiently utilized and the processing load of the edge 1 400a is distributed to the edge 2 400b, the delay occurred during the processing of the first step of the application service request from the device A can be eliminated.

Returning back to step S641, the process of additionally executing module A3 will be described. At step S641, for example, edge 3 400c, on which the delayed module A3 is executing, is identified by referring to the control message shown in Table 5 above. At step S642, for example, it is determined whether module A3 can be additionally executed on edge 3 400c based on the available resource status of edge 3 400c. If it is determined that the module A3 can be additionally executed using the available resources of the edge 3 400c, the module manager 152 of the edge 3 400c causes the application module execution unit 120 of the edge 3 400c to further create an instance for the module A3 and additionally execute the module A3 (step S643). As a result, at edge 3 400c, two instances for the module A3 are executed.

The result of this execution can be more clearly understood with reference to edge 3 400c of FIGS. 5 and 8. One instance for module A3 is executing on edge 3 400c shown in FIG. 5 (323c), while two instances for module A3 are executing on edge 3 400c shown in FIG. 8 (323c and 323c-1). That is, the resources available on edge 3 400c are further utilized in order to create an additional instance for module A3, thereby the processing throughput for the third step of the application service request of device A can be increased, and the delay occurred during the processing of the third step can be eliminated.

After identifying delayed modules at step S630 of FIG. 6 are additionally executed on step S640, at step S650 of FIG. 6, the routing table of each edge 400a, 400b and 400c can be updated by reflecting the additional execution of the delayed modules.

So far, the edge computing device controlling method according to an embodiment of the present invention has been described with reference to FIGS. 6 to 8. In particular, with the present embodiment, it has been described that a method for additionally executing a delayed module on a proper device among the plurality of edge computing devices 400a, 400b and 400c in order to add more resources in execution of the delayed module. It has also been described that the proper device may be selected in consideration of network latency. It will be understood that by the method, modules executing on the plurality of edge computing devices 400a, 400b and 400c can be dynamically adjusted as the service request from the user device increases. Further, it will be understood that the above method facilitates the provision of services, such as connected cars, IoT, VR and AR, where real-time data processing based on ultra-low delay communication is essential. Furthermore, it will be understood that the method may be performed by interaction among a plurality of edge computing devices 400a, 400b and 400c without the control of a central system, such as a cloud server.

Hereinafter, an edge computing device controlling method according to another embodiment of the present disclosure will be described with reference to FIGS. 9 through 11b. In particular, through this embodiment, a method of optimizing the processing path of an application request from a device will be described.

The edge computing device controlling method according to the present embodiment may be performed in a computing device. For example, the computing device may be the edge computing device 100 described with reference to FIGS. 1 and 2 or the edge computing devices 400a to 400c described with reference to FIGS. 4 and 5. In interpreting the edge computing device controlling method according to the present embodiment, the embodiments described with reference to FIGS. 1, 2, 4, and 5 may be reflected. Hereinafter, when the subject of each operation included in the edge computing device controlling method according to the present embodiment is omitted, the subject may be interpreted as a computing device.

Figure 9:
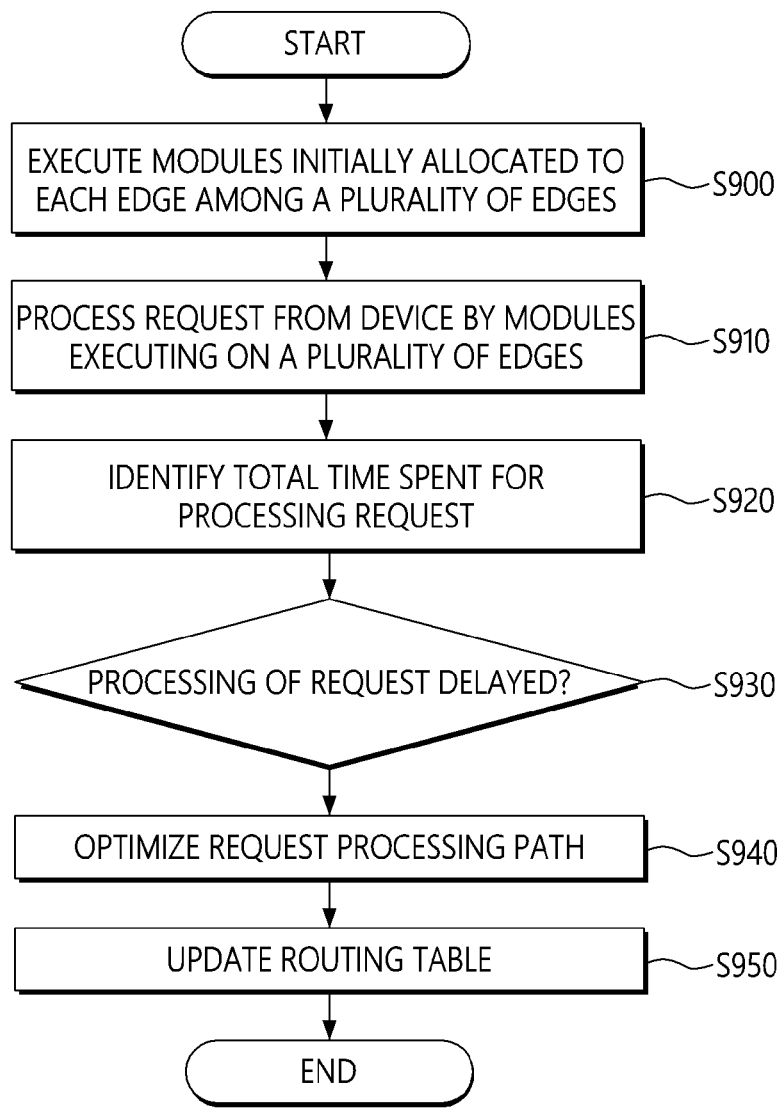
FIGS. 9 and 10 are flowcharts for describing an edge computing device controlling method according to another embodiment of the present disclosure.
Figure 10:
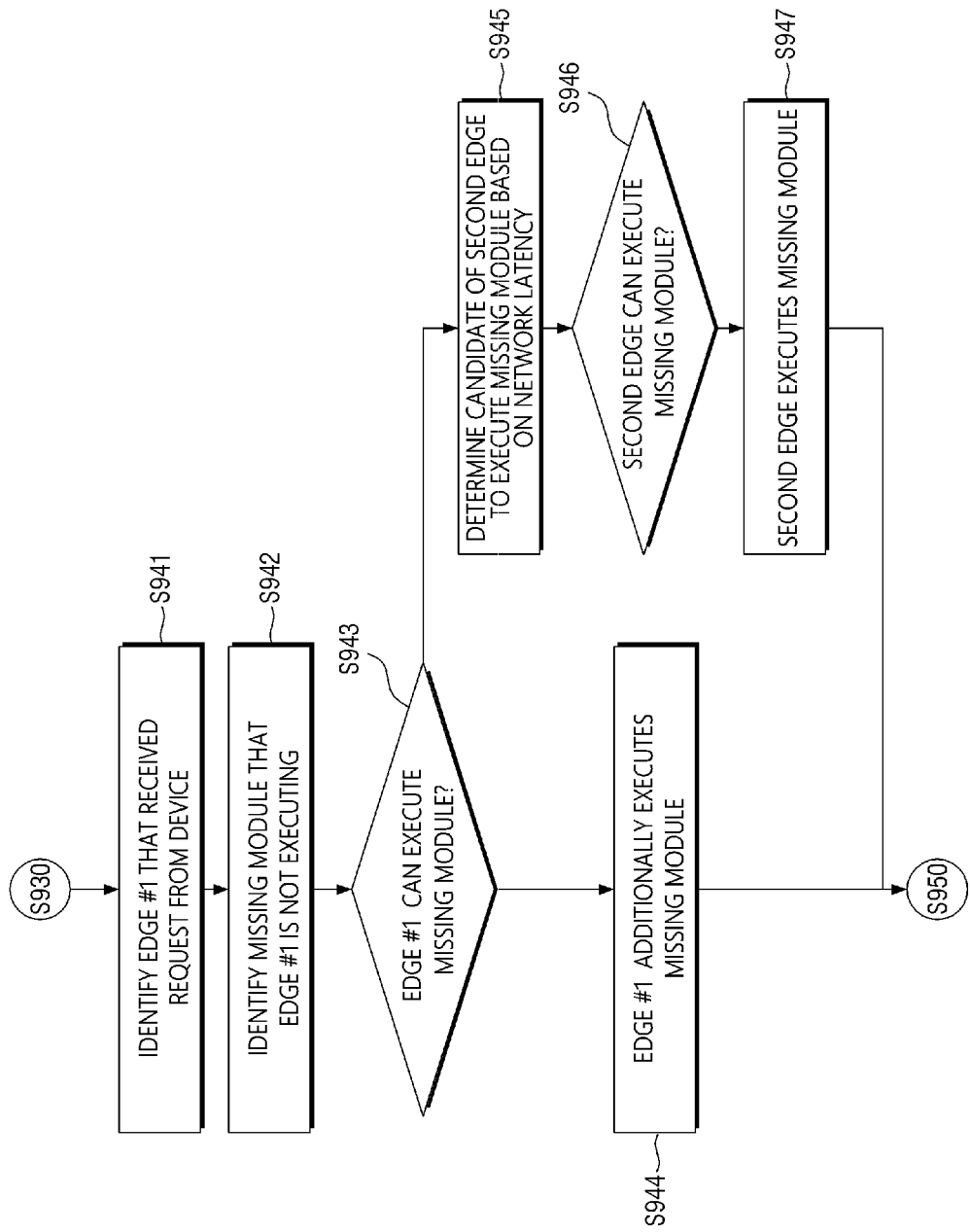
Figure 11B:
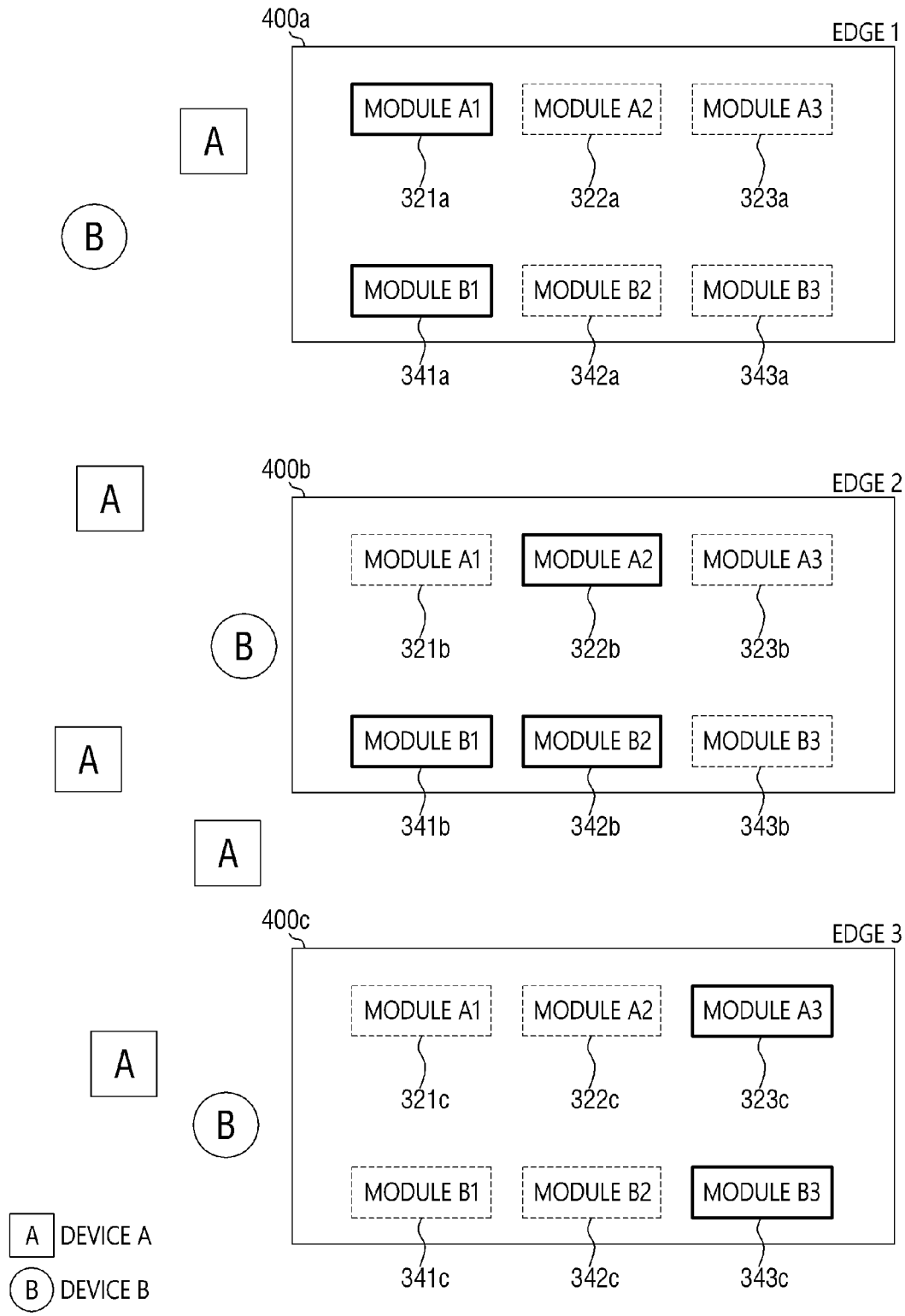

FIGS. 9 and 10 are flowcharts for describing an edge computing device controlling method according to the present embodiment. FIGS. 11a and 11b are diagrams for exemplarily describing function modules executed on a plurality of edge devices as a result of performing the method described with reference to FIGS. 9 and 10.

In the following description of this embodiment, it is assumed that a computing environment is equipped with three edge computing devices 400a to 400c. Further, it is assumed that the initial state of the modules executed on the edge computing devices 400a, 400b and 400c is as shown in FIG. 5. Further, it is assumed that the time allowed for processing the application request of the user device B is as shown in Table 1, and it is assumed that the network latency between the three edge computing devices (edge 1 400a to edge 3 400c) is as shown in Table 2 above.

First, it will be described with reference to FIG. 9. At step S900, respective modules initially allocated to each of the plurality of edges are executed. As a result of performing step S900, for example, as illustrated in FIG. 5, some of the function modules, for example, for user devices A and B may be executed on the plurality of edge computing devices 400a, 400b and 400c, respectively.

At step S910, application service requests from any one user device are processed by modules executed on a plurality of edges. For example, an application service request from any user device B located near edge 3 400c is received by edge 3 400c. Since the module B1 for processing the first step of the application service request from the user device B is not being executed on the edge 3 400c, the request is forwarded to the edge 1 400a by the routing controller 156 of the edge 3 400c. Subsequently, the first step of the request is processed by module B1 341a of edge 1 400a, the request is forwarded to edge 2 400b, and the second step is processed by module B2 342b of edge 2 400b, and then the request is forwarded to edge 3 400c and the third step is processed by module B3 343c of edge 3 400c.

At step S920, the total time required for processing the request is identified through a control message recorded during processing the application request. Step S920 may be performed by the edge 3 400c, which processed the final step of the request. For purposes of description, it is assumed here that the control message is the same as the one shown in Table 6 above.

At step S930, it is determined whether the total time spent for processing the request exceeds the maximum time allowed for processing the request of the user device B. Comparing the control message shown in Table 6 with the maximum allowable time exemplarily described in Table 1 above, since each of the first to third steps was processed within the allowable time described in Table 1, respectively, it indicates that the processing by each of the modules B1 to B3 was not delayed. However, the total time spent for processing the request (89 ms) exceeded the maximum total time shown in Table 1 (80 ms). This implies that there was no delay in the operation of the modules B1 to B3 each processing the first to third steps, but too much network delay has occurred while the request received by the edge 3 400c from the device B being forwarded from the edge 3 400c to the edge 1 400a, edge 2 400b and edge 3 400c sequentially. As in the example of the control message shown in Table 6 above, if the total time spent for processing the request exceeds the allowed maximum value, it is determined that the processing of the request is delayed.

At step S940, optimization of the processing path for the application service request from the user device B is performed, which will be described in detail with reference to FIG. 10

Referring to step S941 of FIG. 10, the edge who first received the delayed request from the device is identified. Referring back to Table 6, edge 3 400c can be identified, which received the request from the device and started processing of the request.

At step S942, it is determined whether there is a missing module that the edge 3 400c is not executing. Looking at the missing module limited to the modules for processing the application request of the user device B, as shown in FIG. 5, the module B3 343c is executing on the edge 3 400c, the remaining modules B1 and B2 are not being executed. That is, modules B1 and B2 can be identified as missing modules. If at least some of the missing modules B1 and B2 not executing on edge 3 400c can be additionally executed on edge 3 400c, the number of times a request is forwarded between the edges during the processing of the request received by the edge 3 400c from the device may decrease.

At step S943, it is determined whether the missing module B1 is executable on edge 3 400c. In some embodiments, the module manager 152 of the edge 3 400c may determine if missing module B1 can be additionally executed on edge 3 400c based on the status of available resource within the edge 3 400c which is provided by the resource monitoring unit 158 of the edge 3 400c.

According to the result of the determination, the missing module B1 is executed on edge 3 400c (step S944).

Although not shown in FIG. 10, steps S943 to S944 may be repeatedly performed for all missing modules of the edge 3 400c. That is, for module B2 determined as the missing module of edge 3 400c at step S942, it is determined whether it is executable on edge 3 400c, and the missing module B2 can be additionally executed according to the result.

The result of the execution of steps S942 to S944 can be more clearly understood with reference to edge 3 400c of FIGS. 5 and 11a. In FIGS. 11a and 11b to be described later, modules shown with thick solid border lines are executing on the corresponding edge computing device, and modules shown with dotted border line are modules not executing on the corresponding edge computing device.

Although the module B1 341c and the module B2 342c are not executing on the edge 3 400c shown in FIG. 5, the edge 3 400c shown in FIG. 11a is changed to the state, in which these modules are executing. As a result, when edge 3 400c receives an application service request from user device B, it does not forward the request to edge 1 400a and/or edge 2 400b for processing of some steps of the request. Instead, edge 3 (400c) can process all steps of the request. In other words, by eliminating the network delay occurred in forwarding the application request between the edges, the total time required for processing a request can be shortened. As a result, the processing of the request from the user device B can be completed within 60 ms, which is the maximum total time allowed for the processing of the request from the user device B.

Referring back to FIG. 10, at step S943, the case, where it is determined that edge 3 400c cannot execute module B1, will be described.

At step S945, the module manager 152 selects a candidate for the second edge capable of executing the missing module B1. In the present embodiment, a candidate for the second edge is selected by giving priority to an edge with low network latency from edge 3 400c. In order to shorten total network delay between the edges in the processing of the application request of the device B flowing into the edge 3 400c, it is better to select an edge with a lower network latency from the edge 3 400c. If the network latency between edge 1 400a, edge 2 400b and edge 3 400c is as shown in Table 2 above, among edge 1 400a and edge 2 400b, edge 2 400b with lower network latency from edge 3 400c may be considered as a first candidate for a second edge.

At step S946, it is determined whether the candidate for the second edge selected at step S945 can execute missing module B1. The candidate for the second edge may determine whether the missing module B1 is executable based on its available resource status and provide result of such determination to the edge 3 400c.

Although not shown, if it is determined at step S946 that none of the candidates for the second edge can additionally execute the missing module B1, such determination result is provided to the cloud server 10 so that the cloud server 10 may process some of the service request of the device B.

When the missing module B1 is executable with the available resources of the candidate for the second edge, the second edge is decided, and the missing module B1 is executed on the second edge (step S947). For example, when the missing module B1 can be executed with the available resources of the edge 2 400b, the module manager 152 of the edge 2 400b causes the application module execution unit 120 of the edge 2 400b to create an instance for module B1 and execute module B1 (step S947).

Although not shown in FIG. 10, steps S945 to S947 may be repeatedly performed for the module B2 determined as the missing module of the edge 3 400c at step S942.

The result of the execution of steps S945 to S947 regarding the case, where it is determined that the edge 3 400c cannot execute the module B1 and the module B2 at step S943 can be more clearly understood with reference to the edge 2 400b of FIGS. 5 and 11b. At the edge 2 400b shown in FIG. 5, only the module B2 342b is executing, but at the edge 2 400b shown in FIG. 11b, it is changed to the state, in which the module B1 341b and the module B2 342b are executing. As a result, when edge 3 400c receives an application service request from user device B, the request is forwarded to edge 2 400b (it takes 8 ms when referring to Table 2). The request is forwarded back to edge 3 400b after the first and second steps are processed by modules B1 341b and B2 342b executing on edge 2 400b (it takes 8 ms). The third step of the request is processed by module B3 343c executing on edge 3 400c. As such, the processing path of the application service request from the user device B is changed, thereby the network latency caused by the forwarding of requests between the edges is reduced and the processing of the request from the user device B can be completed within 60 ms, which is the maximum total time allowed for processing of the request from the user device B.

As described above, after additionally executing some modules through steps S941 to S947 of FIG. 10, the process of optimizing a path for processing a request of a user device is performed. And then, at step S950 of FIG. 9, the routing table of each edge 400a, 400b and 400c can be updated by reflecting additional execution of some modules.

So far, the edge computing device controlling method according to an embodiment of the present disclosure has been described with reference to FIGS. 9 to 11b. By the above method, in order to satisfy the maximum latency allowed by the user device in the process of distributing and processing the service request from the user device by the plurality of edge computing devices 400a, 400b and 400c, modules executing on the plurality of edge computing devices 400a, 400b and 400c can be dynamically adjusted. In other words, by additionally executing some modules in a proper device that causes minimal network latency among the plurality of edge computing devices 400a, 400b and 400c, the processing path of the request from the user device can be optimized. By the above method, it will be understood that the provision of services, such as connected cars, IoT, VR, and AR, where real-time data processing based on ultra-low delay communication is essential, can be facilitated. Furthermore, it will be understood that the method may be performed merely by interaction between a plurality of edge computing devices 400a, 400b and 400c without the control of a central system, such as a cloud server.

Embodiments of the present disclosure described so far with reference to FIGS. 1 through 11b may be implemented in a computer-readable code on a computer-readable medium. The computer-readable recording medium may be, for example, a removable recording medium (CD, DVD, Blu-ray disc, USB storage device, removable hard disk) or a fixed recording medium (ROM, RAM, computer equipped hard disk). The computer program recorded on the computer-readable recording medium may be transmitted to other computing device via a network such as the Internet and installed in the other computing device, thereby being used in the other computing device.

Hereinafter, a configuration of an exemplary computing device capable of implementing an edge computing device according to various embodiments of the present disclosure will be described.

A computing device capable of implementing a system according to various embodiments of the present disclosure may include a processor, a memory, a network interface, a storage and a system bus connecting the processor, the memory, the network interface and the storage.

The storage may store a communication module, an application execution module and a control module. Each of the modules is software that operates separately, and the binary is loaded into a memory and then executed at a processor, so that the computing device performs data processing and control related operations.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, it should not be understood that the operations must be performed in the specific order or sequential order shown, or that all the illustrated operations must be executed to achieve the desired results. In certain circumstances, multitasking and parallel processing may be advantageous. Moreover, the separation of the various configurations in the embodiments described above should not be understood as requiring that separation, and it should be understood that the described program components and systems may generally be integrated together into a single software product or packaged into multiple software products.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A system comprising:
a user device comprising a hardware device;
a cloud;
a plurality of edge computing devices connected to the cloud, the plurality of edge computing devices physically spaced from and wireless-connected to each other to process a service request from the user device, each edge computing device comprising:
an application module execution unit to execute function modules comprising a first function module and a second function module;
a controller to control the application module execution unit;
a communication unit to communicate with the other edge computing devices; and
a storage unit to store executable files of the function modules,
wherein the plurality of edge computing devices are controlled by the controller of a first edge computing device among the plurality of edge computing devices;
the service request is received at the first edge computing device among the plurality of edge computing devices, and the service request is to be processed through a plurality of steps comprising a first step and then a second step;
the first edge computing device has a routing table that indicates function modules executed on each of the plurality of edge computing devices, and the first edge computing device first-selects an edge computing device having the first function module which is indicated as being executed on the routing table, among the plurality of edge computing devices;
the first function module of the first-selected edge computing device performs the first process;
the first selected edge computing device second-selects an edge computing device having the second function module which is indicated as being executed on the routing table, among the plurality of edge computing devices;
the first-selected edge computing device transmits the service request and a first processed result to the second-selected edge computing device; and
the second function module of the second-selected edge computing device performs the second process,
wherein the system identifies a delayed module by determining if a processing time to complete the first process and a processing time to complete the second process is over a preset time allowed for processing the first process and a preset time allowed for processing the second process, respectively, and determining if a total time spent for processing the service request by the plurality of edge computing devices exceeds a maximum time allowed for completion of processing of the service request;
if the delayed module is identified, the plurality of edge computing devices are interacted to each other without a control of a central system to be configured to:
determine if an instance for the delayed module can be created on the edge computing device having the delayed module by monitoring an available resource of the delayed module, wherein the available resource is at least one selected from the group consisting of an available memory, an available processing time, an available storage capacity;
additionally execute the delayed module by the created instance if the edge computing device having the delayed module has the available resource to create the instance;
determine a candidate edge computing device to execute the delayed module based on network latency if the edge computing device having the delayed module does not have the available resource to create the instance;
determine if the candidate edge computing device has an available resource to be executable;
execute the delayed module on the determined candidate edge computing device if the candidate edge computing device has the available resource; and
execute the delayed module on the cloud server if none of the plurality of edge computing devices has the available resource; and
if the total time spent exceeds the maximum time, the plurality of edge computing devices are interacted to each other without a control of a central system to be configured to:
identify a first missing module which is not executed at the first edge computing device, a second missing module which is not executed at the first-selected edge
computing device, and a third missing module which is
not executed at the second-selected edge computing
device;
determine whether the first edge computing device has
available resource to execute the first missing module,
whether the first-selected edge computing device has
available resource to execute the second missing module, and whether the second-selected edge computing
device has available resource to execute the third
missing module;
execute the first missing module on the first edge computing device if the first edge computing device is
determined to have the available resource, execute the
second missing module on the first-selected edge computing device if the first-selected edge computing
device is determined to have the available resource, and
execute the third missing module on the second-selected edge computing device if the second-selected
edge computing device is determined to have the
available resource; and
execute at least one of the first, second and third missing
modules on the cloud server if none of the first edge
computing device, the first-elected computing device
and the second-selected computing device have the
available resource.

2. A method for controlling a plurality of edge computing devices physically spaced from and wireless-connected to each other to process a service request and connecting a user device and a cloud, each edge computing device comprising an application module execution unit to execute function modules comprising a first function module and a second function module, a controller to control the application module execution unit, a communication unit to communicate with the other edge computing devices and a storage unit to store executable files of the function modules, the method comprising:
receiving the service request at a first edge computing
device among the plurality of edge computing devices,
the service request being to be processed through a
plurality of processes comprising a first process and
then a second process;
first-selecting, by the first edge computing device having
a routing table that indicates function modules executed
on each of the plurality of edge computing devices, an
edge computing device having the first function module which is indicated as being executed on the routing
table, among the plurality of edge computing devices,
wherein, when more than one edge computing devices
have the first function modules which are indicated as
being executed on the routing table, the edge computing device having the lowest network latency from the
first edge computing device is selected;
performing the first process at the first function module of
the first-selected edge computing device;
second-selecting, by the first selected edge computing
device, an edge computing device having the second
function module which is indicated as being executed
on the routing table, among the plurality of edge
computing devices, wherein, when more than one edge
computing devices have the second function modules
which are indicated as being executed on the routing
table, the edge computing device having the lowest
network latency from the first-selected edge computing
device is selected;
transmitting the service request and a first processed result
from the first-selected edge computing device to the
second-selected edge computing device;
performing the second process at the second function
module of the second-selected edge computing device;
identifying a delayed module by determining that a processing time to complete the first process and a processing time to complete the second process is over a
preset time allowed for processing the first process and
a preset time allowed for processing the second process, respectively, and determining that a total time
spent for processing the service request by the plurality
of edge computing devices exceeds a maximum time
allowed for completion of processing of the service
request;
when the delayed module is identified, the service request
is processed by:
determining if an instance for the delayed module can be
created on the edge computing device having the
delayed module by monitoring an available resource of
the delayed module, wherein the available resource is
at least one selected from the group consisting of an
available memory, an available processing time, an
available storage capacity;
when the edge computing device having the delayed
module has the available resource to create the
instance, additionally executing the delayed module by
the created instance;
when the edge computing device having the delayed
module does not have the available resource to create
the instance, determining a candidate edge computing
device to execute the delayed module based on network
latency;
determining if the candidate edge computing device has
an available resource to be executable;
executing the delayed module on the determined candidate edge computing device when the candidate edge
computing device has the available resource; and
executing the delayed module on the cloud server when
none of the plurality of edge computing devices has the
available resource; and
when the total time spent exceeds the maximum time, the
service request is processed by:
identifying a first missing module which is not executed
at the first edge computing device, a second missing
module which is not executed at the first-selected edge
computing device, and a third missing module which is
not executed at the second-selected edge computing
device;
determining whether the first edge computing device has
available resource to execute the first missing module,
whether the first-selected edge computing device has
available resource to execute the second missing module, and whether the second-selected edge computing
device has available resource to execute the third
missing module;
executing the first missing module on the first edge
computing device when the first edge computing device
is determined to haw the available resource, executing
the second missing module on the first-selected edge
computing device when the first-selected edge computing device is determined to have the available resource,
and executing the third missing module on the second-selected edge computing device when the second-selected edge computing device is determined to have
the available resource; and executing at least one of the first, second and third missing modules on the cloud server if none of the first edge computing device, the first-elected computing device and the second-selected computing device have the available resource, wherein the method is performed by interaction among the plurality of edge computing devices without a central system controlling the plurality of edge computing devices.

3. The method of claim 2, wherein the additional execution of the first function module comprises updating, by the first edge computing device, the routing table.

4. The method of claim 2, wherein the first-selected edge computing device is the first edge computing device.

* * * * *